(No Model.)

D. A. RITCHIE.
SHEET METAL EXPANSIBLE ELBOW.

No. 342,465. Patented May 25, 1886.

Witnesses.
Fred L. Emery
John F. C. Prentiss

Inventor.
David A. Ritchie
by Crosby & Gregory
attys.

UNITED STATES PATENT OFFICE.

DAVID A. RITCHIE, OF CAMBRIDGE, MASSACHUSETTS.

SHEET-METAL EXPANSIBLE ELBOW.

SPECIFICATION forming part of Letters Patent No. 342,465, dated May 25, 1886.

Application filed December 26, 1885. Serial No. 186,825. (No model.)

*To all whom it may concern:*

Be it known that I, DAVID A. RITCHIE, of Cambridge, county of Middlesex, and State of Massachusetts, have invented an Improvement in Sheet-Metal Expansible Elbows, of which the following description, in connection with the accompanying drawings, is a specification, like letters on the drawings representing like parts.

To obviate the bursting of tin and galvanized-iron pipes when water freezes therein—as when employed for conductors—such pipe has been provided with corrugations or flutes, so as to enable the pipe to yield to pressure exerted inside the pipe.

Pipe of the class referred to, very satisfactory for the purpose intended has been joined by elbows made from the same pipe by cutting or slitting the same at one side at several points, removing small gores thereof, so that the pipe may be curved, and the edges left by cutting into the side of the pipe are then soldered together.

Elbows of the class referred to are unsatisfactory, for the reason that the soldering of the edges brought together by curving the pipe substantially prevents the expansion of the pipe, and the cost of slitting the pipe and bending and soldering the edges is very considerable, and the elbows so made are unsightly and liable to leak or overflow at the joints formed by the edges, especially in the case of galvanized iron, to which solder does not firmly adhere.

By experiment I have discovered that I can produce an elbow having all the expansive qualities of the pipe, the elbow having substantially the same appearance as the pipe.

In the manufacture of my improved expansible elbow I take blanks, concave at one edge and convex at the other, and subject them to the action of corrugating-dies, which corrugate the said blanks, and at the same time give them a general semicircular outline, and in such condition the flanges of the corrugated blanks can be joined together by folding the flanges to form a locking-joint.

Figure 1:
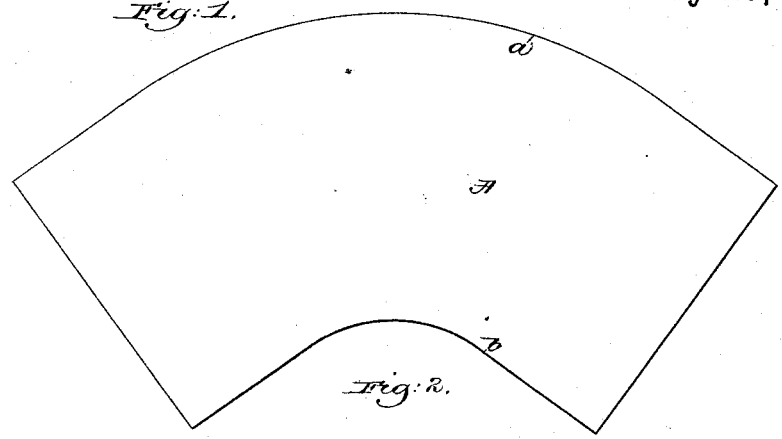
Figure 2:
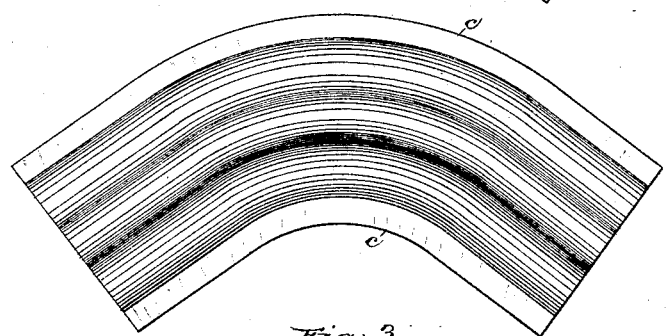
Figure 3:
Figure 4:
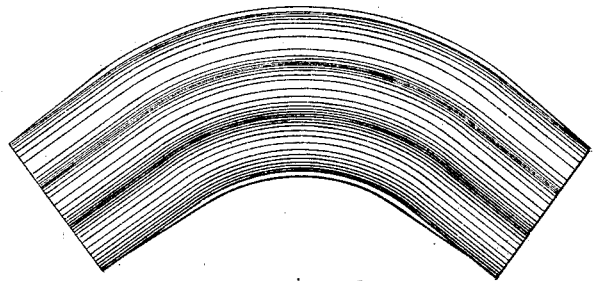
Figure 5:
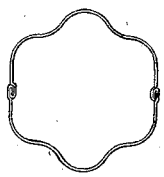

Figure 1, in elevation, shows a metal blank from which to make an expansible elbow embodying my invention; Fig. 2, the said blank after being corrugated; Fig. 3, a section of Fig. 2; Fig. 4, a completed elbow, and Fig. 5 a cross-section thereof.

My improved elbow is made from two sheet-metal blanks, A, shaped substantially as shown in Fig. 1, where it will be seen that the longer edge, *a*, of the blank is convex and the shorter edge, *b*, concave. These blanks are placed between dies of such configuration as to leave the blank subjected to pressure between them in the form represented in Figs. 2 and 3—that is, substantially semicircular and corrugated from end to end—the flanges or edges of the blank being left to extend, as at *c*, the said edges of two pieces being subsequently folded or locked together, as in Fig. 5, to form a locked seam extending throughout the length of the elbow, the latter being without any transverse seam or joint, as heretofore common in this class of elbows.

In practice I have found that the corrugations obviate the formation of transverse wrinkles in the shorter edge of the blank as it is acted upon in the die, leaving all parts of the elbow uniform in appearance and entirely free from any transverse wrinkles.

I claim—

As an improved article of manufacture, a sheet-metal elbow composed of curved and longitudinally-corrugated pieces of metal having only longitudinal seams, whereby the said elbow is free to expand uniformly to avoid twisting, substantially as described.

In testimony whereof I have signed my name to this specification in the presence of two subscribing witnesses.

DAVID A. RITCHIE.

Witnesses:
 ALFRED L. BARBOUR,
 WILLIAM E. BURRAGE.

Correction in Letters Patent No. 342,465.

It is hereby certified that in Letters Patent No. 342,465, granted May 25, 1886, upon the application of David A. Ritchie, of Cambridge, Massachusetts, for an improvement in "Sheet-Metal Expansible Elbows," an error appears in the printed specification requiring the following correction, viz: In line 83, page 1, the word "twisting" should read *bursting;* and that the Letters Patent should be read with this correction therein to make it conform to the record of the case in the Patent Office.

Signed, countersigned, and sealed this 1st day of June, A. D. 1886.

[SEAL.]

H. L. MULDROW,
*Acting Secretary of the Interior.*

Countersigned:
    M. V. MONTGOMERY,
        *Commissioner of Patents.*